United States Patent [19]

Wang

[11] Patent Number: 5,515,998
[45] Date of Patent: May 14, 1996

[54] FROZEN CONFECTION HOLDER AND RECEPTACLE

[76] Inventor: Paul S. Wang, 13620 Benson Ave., Chino, Calif. 91710

[21] Appl. No.: 538,275

[22] Filed: Oct. 2, 1995

[51] Int. Cl.⁶ ................................................. A47G 19/22
[52] U.S. Cl. ........................ 220/710; 220/571; 220/174; 220/719; 220/DIG. 6
[58] Field of Search ................................. 220/710, 708, 220/719, 571, 574, DIG. 6

[56] References Cited

U.S. PATENT DOCUMENTS

| | | | |
|---|---|---|---|
| 293,190 | 2/1884 | Moore | 220/710 |
| 4,013,105 | 3/1977 | Skallio | 220/571 |
| 4,953,725 | 9/1990 | Buj | 220/710 |
| 5,168,586 | 12/1990 | Small | 220/571 |
| 5,275,304 | 1/1994 | Abrams | 220/710 |
| 5,305,810 | 4/1994 | Meshberg | 220/710 |

Primary Examiner—Joseph M. Moy

[57] ABSTRACT

A holder for a frozen confection, such as an ice cream stick, or the like, which serves to hold the frozen confection in an upright position. The holder includes a trough-like upper dish which is slotted to maintain the stick of the frozen confection in an upright position, and which is shaped to catch any drips from the frozen confection as it melts. The dish fits into the open end of a cylindrical base, and it is apertured so that the collected drips from the frozen confection flow into a reservoir which is formed in the upper end of the base. The drips are accumulated in the reservoir to produce a liquid. An upwardly inclined tubular member is fitted into the side of the base and extends into the reservoir to form a drinking straw. An intermediate circular handle is formed in the tubular member.

5 Claims, 6 Drawing Sheets

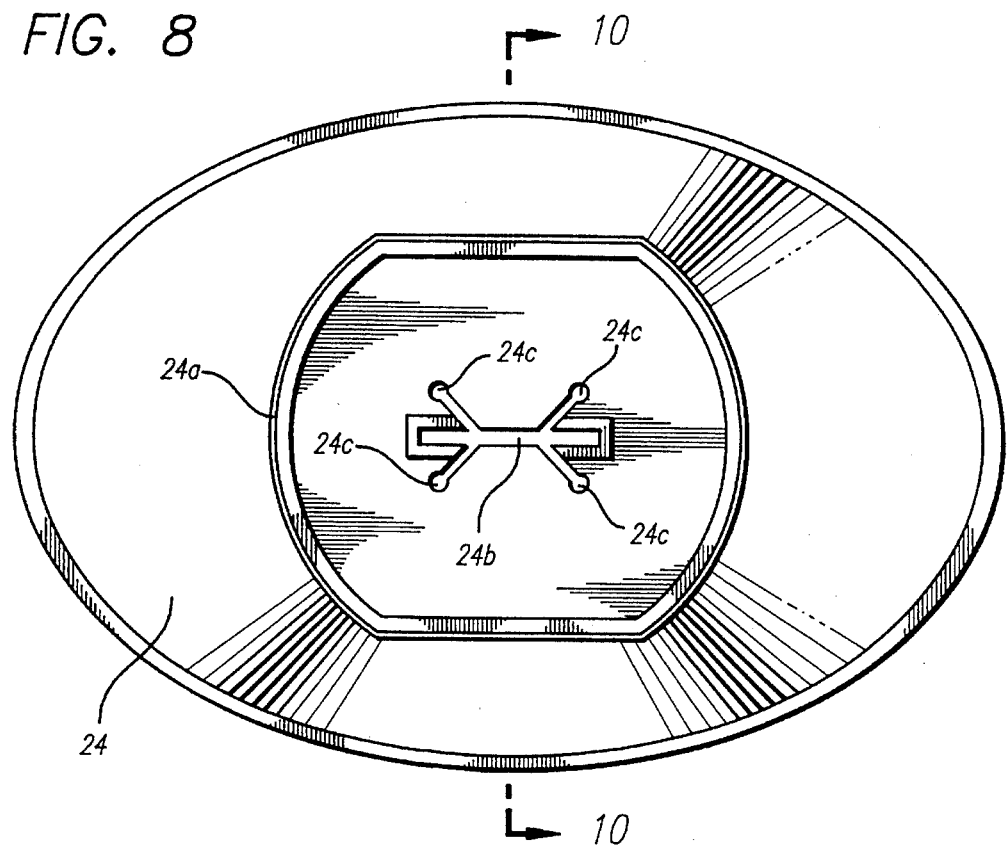
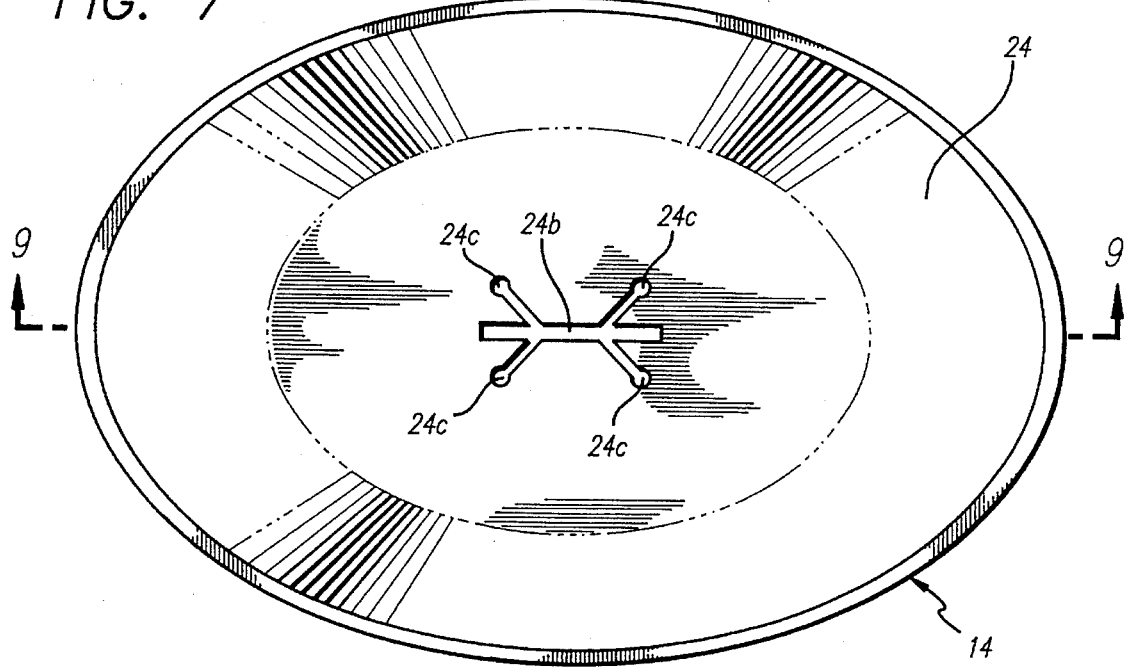

FROZEN CONFECTION HOLDER AND RECEPTACLE

BACKGROUND OF THE INVENTION

The present invention relates to an improved dripless holder for a frozen confection for maintaining the frozen confection in an upright position, and to catch the drips from the frozen confection as it melts. The frozen confection may be a frozen fluid water on a stick, known as a "popsicle," or it may be a frozen ice cream bar on a stick, or other easily melted confections.

The holder of the invention is constructed to hold the frozen confection in an upright position while it is being eaten, or while it is awaiting consumption. The holder includes a trough-like upper dish which has a slit formed in its bottom through which the stick of the invention extends, so that the confection may be held in an upright position and so that any drips from the confection are caught by the dish.

The dish fits into the open top of a cylindrical base, and it is apertured so that the collected drips from the frozen confection flow into a cylindrical reservoir formed in the base. The drips are accumulated in the reservoir as a liquid. An upwardly inclined rigid tubular plastic member is fitted into the side of the base and it extends into the reservoir. The tubular member forms a drinking straw which permits liquid in the reservoir to be consumed. The tubular member may have an offset circular intermediate portion which forms a handle.

The dish is frictionally held in the base, and it can be easily removed for washing purposes. The dish and the base may be formed of any appropriate plastic material. The dish is constructed to hold the stick of the frozen confection firmly in an upright position to assure that all the drips are caught in the dish. All the drips caught in the dish flow through apertures into the reservoir in the base. The base and handle are preferably dimensioned to be easily held by a small child.

The base is shaped to have a lower pedestal which assures that it will stand on a table top in a stable upright position. This will assure that no drips from the frozen confection will spill onto the table top. The liquid contents of the reservoir may be consumed by the child by sucking the liquid contents through the tubular member while the assembly is held by the handle formed in the tubular member.

It is accordingly an object of the invention to provide an improved dripless holder for a popsicle, ice cream stick, or the like, which may be easily held by children, and which assures that all the drips from the confection are trapped and may be subsequently consumed through the straw.

BRIEF DESCRIPTION OF THE DRAWINGS

FIG. 7 is a top view of a dish member which is inserted into the open top of the base, and which serves to catch the drips from the confection held by the holder;

FIG. 8 is a bottom view of the dish of FIG. 7;

DETAILED DESCRIPTION OF THE ILLUSTRATED EMBODIMENT

Figure 1:
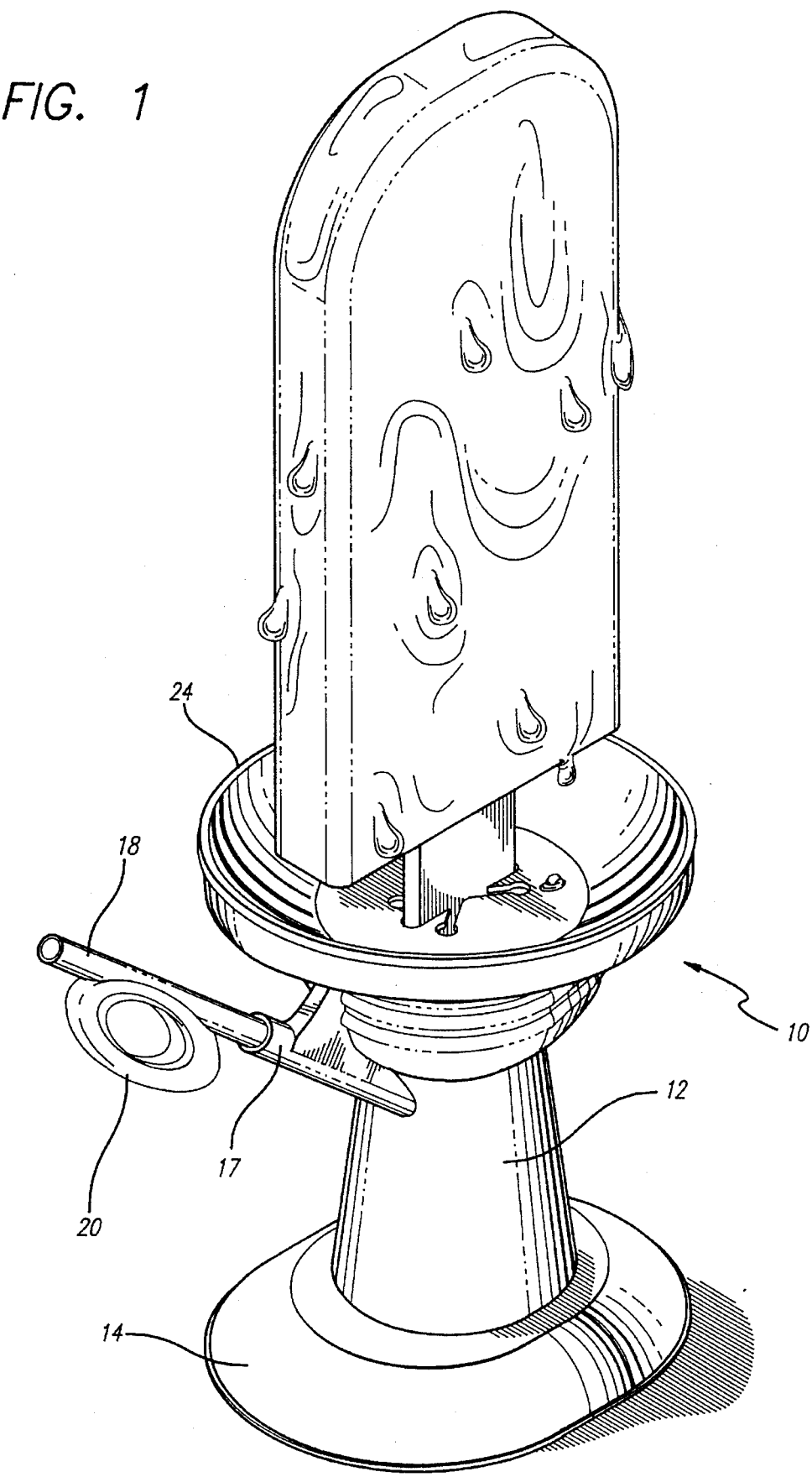
FIG. 1 is a perspective view of the holder of the invention taken from one side and above the holder, and showing an ice cream bar being held in the holder.

The dripless holder of the present invention is designated 10 in FIG. 1, 7 and it is formed of a cylindrical base 12 and a dish member 24 which is fitted over the open top of the base in friction fit with the base, and which closes the open top. A pedestal 14 is formed integral with the base, and it serves to hold the base in an upright position when it is placed on a horizontal surface.

Figure 3:
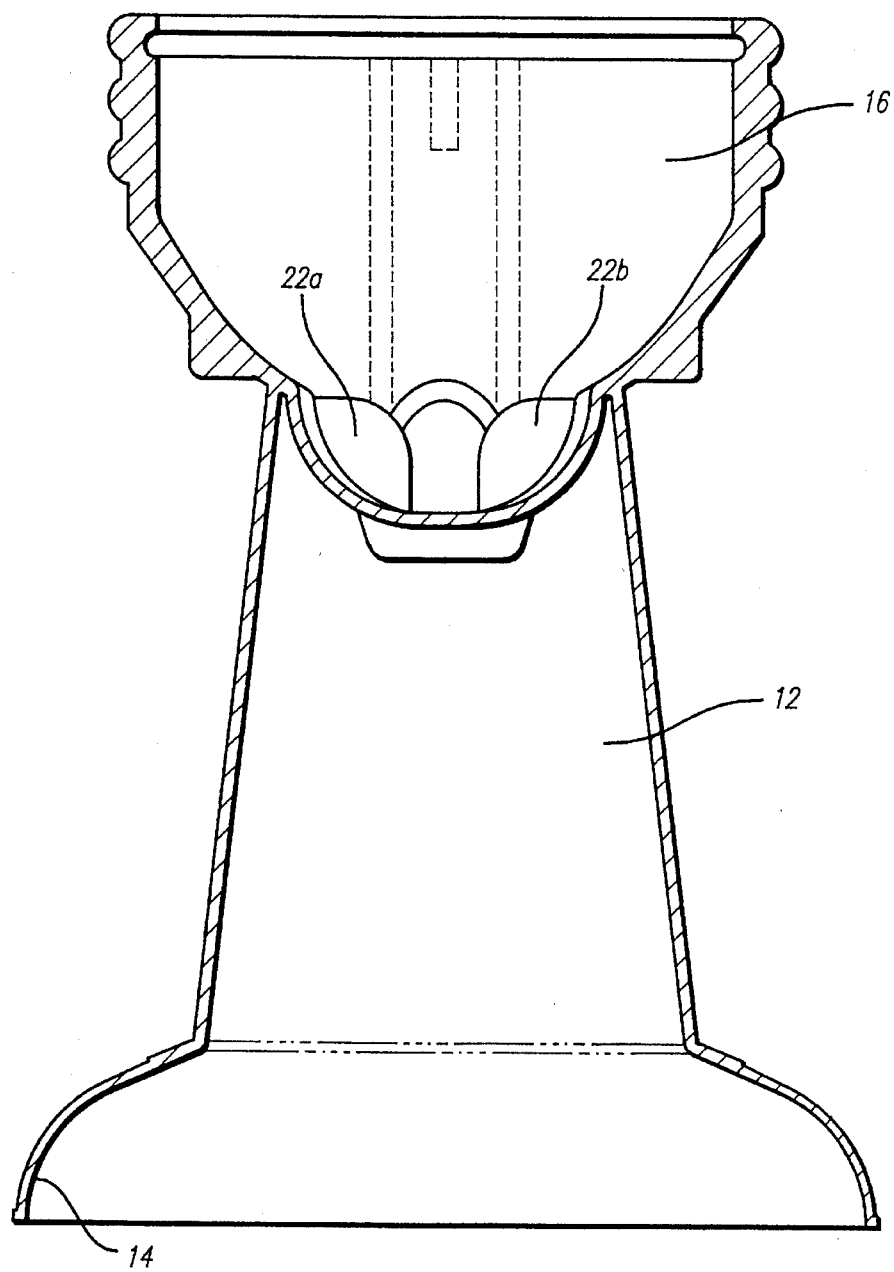
FIG. 3 is a sectional view taken substantially along the line 3—3 of FIG. 1.
Figure 4:
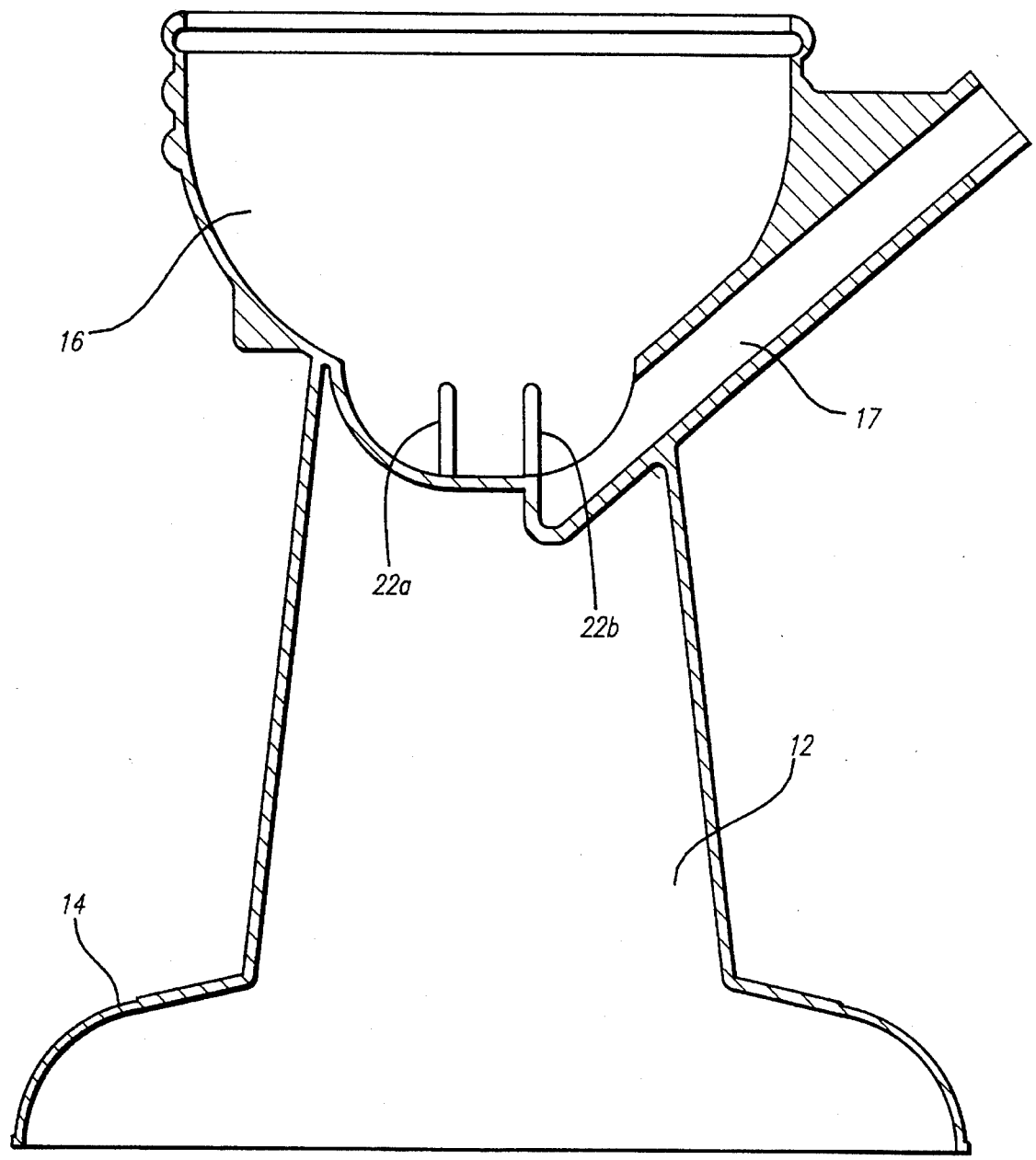
FIG. 4 is a sectional view like the view of FIG. 3, but with the base turned 90 degrees on its longitudinal axis.

As best shown in FIGS. 3 and 4, the base 12 has a reservoir 16 formed at its upper end directly under the open top of the base. As best shown in FIG. 1, a tubular member 18 extends upwardly and outwardly through the side of the base 12 and into the interior of the reservoir 16. The tubular member 18 is received in a socket 17 which is formed integral with the base.

Figure 5:
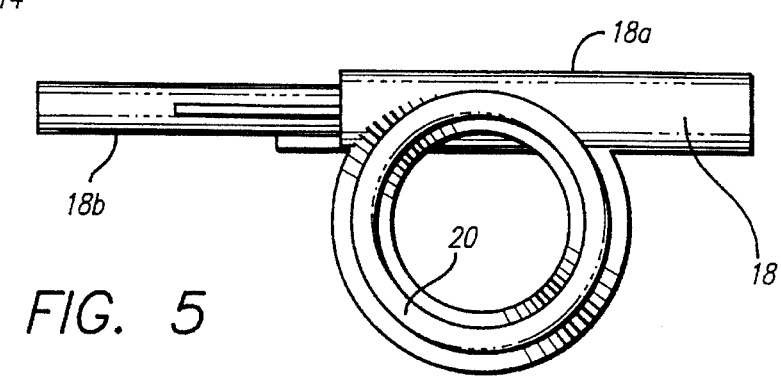
FIG. 5 is a side view of a tubular member which may be inserted into the base to form a drinking straw.
Figure 6:
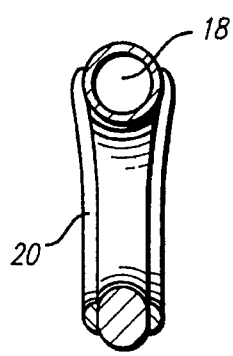
FIG. 6 is an end view of the tubular member of FIG. 5.
Figure 10:
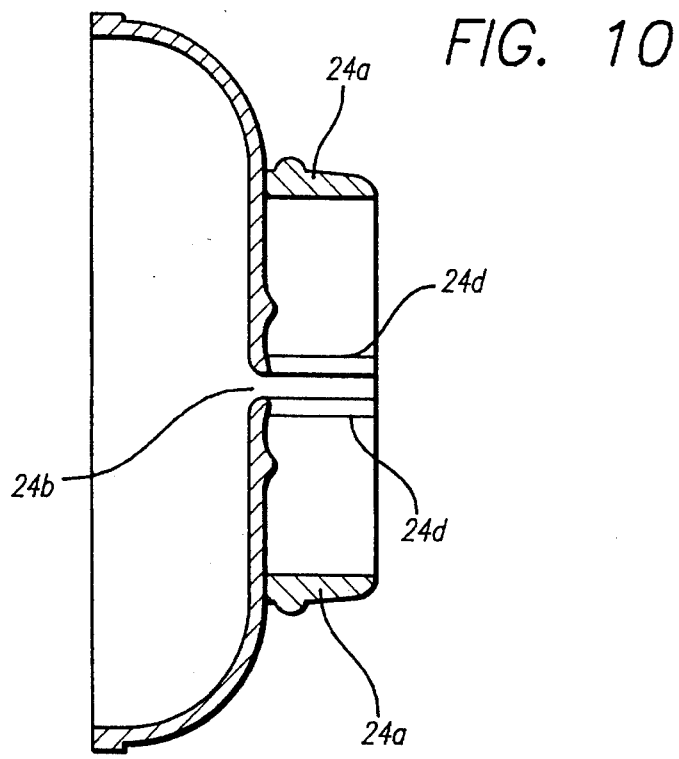
FIG. 10 is a sectional view of the dish member taken essentially along the line 10—10 of FIG. 8.
Figure 9:
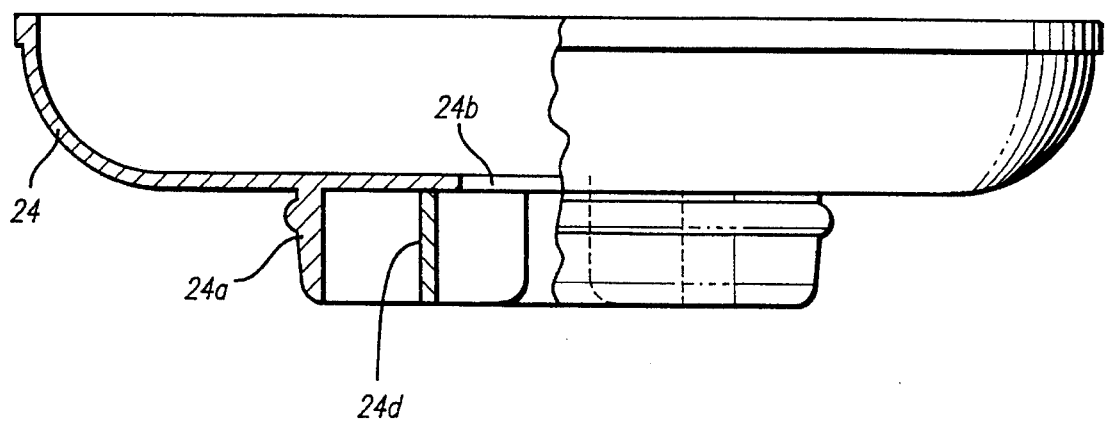
FIG. 9 is a side view, partly in section, taken along the line 9—9 of the dish member of FIG. 7.

Details of the tubular member 18 are best shown in FIGS. 5 and 6. As shown, the tubular member has a hollow end section 18a at one end and a hollow end section of reduced diameter 18b at the other end. End section 18a is intended to be inserted into socket 17 in the side of the base 12, which serves to hold the tubular member firmly in an inclined upright position. As also shown in FIGS. 5 and 6, a circular member 20 is formed in the end portion 18a of the tubular member in an offset position to serve as a handle for the holder.

Figure 2:
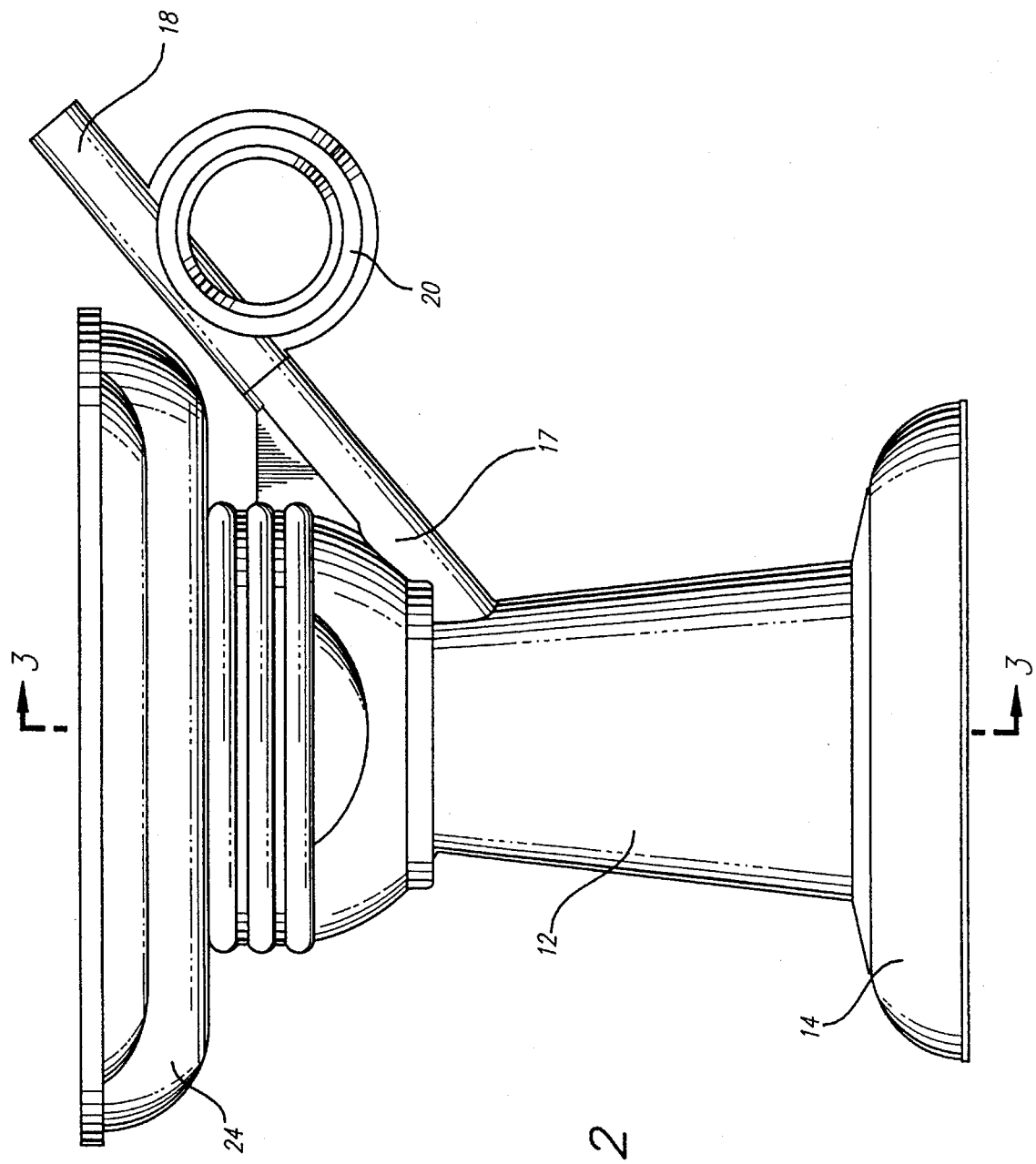
FIG. 2 is a side elevational view of the base of the holder with a trough-like dish member inserted into its top.

Supports 22a and 22b (FIGS. 3 and 4) are formed at the bottom of the reservoir 16 to assure that the stick of the frozen confection will be firmly held within the holder. A trough-like dish member 24 is shown in FIGS. 7–10, and it includes an annular portion 24a (FIG. 8) which is configured to fit into the open top of base 12 to hold the dish firmly in place in the position shown in FIG. 2. The bottom of dish 24 contains a slot 24b (FIGS. 7 and 8) which receives the stick of the confection and which cooperates with the members 22a, 22b (FIG. 4) of the base to hold the stick firmly in an upright position.

Appropriate apertures 24c are formed in the bottom of the dish member adjacent to the slot 24b, as shown in FIGS. 7 and 8), so that the drips collected by the dish member will fall into the reservoir 16 in the base. Guides 24d (FIGS. 9 and 10) extend downwardly from the bottom of the dish-shaped member adjacent to the slot 24b to assist in holding the stick of the confection firmly in an upright position.

It is evident from the foregoing description that when the stick of a frozen confection is inserted through the slot 24b in the bottom of the dish 24 that the confection is firmly held in an upright position, all the drips from the confection will be caught by the dish 24. The accumulated liquid will then pass through the aperture 24b into the reservoir 16 in the base, and the liquid may subsequently be removed from the reservoir by sucking it out through the tubular member 18 which serves as a drinking straw. While the confection is being consumed, it can be held either by grasping the base itself or by grasping the handle 20 formed in the base.

It will be appreciated that while a particular embodiment of the invention has been shown and described, modifications may be made. It is intended in the claims to cover all modifications which come within the true spirit and scope of the invention.

I claim:

1. A holder for the stick of a frozen confection comprising: a trough-like apertured dish having an intermediate slot therein for receiving the stick of the frozen confection so as to hold the frozen confection in an upright position above the dish; a cylindrical-shaped base having an open top for receiving the dish with the dish closing the open top; a pedestal formed at the lower end of the base for supporting the base in an upright position on a horizontal supporting surface; a reservoir formed in the base for receiving liquid from the apertured dish; and a tubular drinking straw extending through the side of the base and into the reservoir for removing liquid from the reservoir.

2. The holder defined in claim 1, in which the reservoir, is formed in the upper end of the base.

3. The holder defined in claim 1, in which the drinking straw is a tubular rigid member inclined upwardly and outwardly with respect to the base.

4. The holder defined in claim 3, in which the base, the reservoir and the drinking straw are formed of a plastic material.

5. The holder defined in claim 3, in which the drinking straw has an intermediate offset circular handle formed therein.

* * * * *